(12) United States Patent
England et al.

(10) Patent No.: US 11,079,650 B2
(45) Date of Patent: Aug. 3, 2021

(54) TEMPERATURE CONTROL FOR ELECTROCHROMIC DEVICES

(71) Applicant: HELIOTROPE TECHNOLOGIES, INC., Alameda, CA (US)

(72) Inventors: David England, Warrington (GB); Jason K. Holt, Larkspur, CA (US); Guillermo Garcia, Oakland, CA (US); Scott Thomsen, South Lyon, MI (US); Peter Green, Phoenix, AZ (US); Amir Bayati, Santa Clara, CA (US)

(73) Assignee: HELIOTROPE TECHNOLOGIES, INC., Alameda, CA (US)

( * ) Notice: Subject to any disclaimer, the term of this patent is extended or adjusted under 35 U.S.C. 154(b) by 112 days.

(21) Appl. No.: 16/420,569

(22) Filed: May 23, 2019

(65) Prior Publication Data

US 2019/0361311 A1 Nov. 28, 2019

Related U.S. Application Data

(60) Provisional application No. 62/675,913, filed on May 24, 2018.

(51) Int. Cl.
*G02F 1/163* (2006.01)
*G02F 1/153* (2006.01)
*G02F 1/1523* (2019.01)

(52) U.S. Cl.
CPC ............ *G02F 1/163* (2013.01); *G02F 1/1525* (2013.01); *G02F 1/1533* (2013.01)

(58) Field of Classification Search
CPC .......... G02F 1/155; G02F 1/163; G02F 1/153; G02F 1/1533; G02F 1/1525; E06B 2009/2464; B60J 3/04

USPC .......................................................... 359/270
See application file for complete search history.

(56) References Cited

U.S. PATENT DOCUMENTS

| | | | |
|---|---|---|---|
| 7,133,181 B2 | 11/2006 | Greer | |
| 8,344,288 B2 | 1/2013 | Door et al. | |
| 10,203,582 B2 | 2/2019 | Garcia et al. | |
| 2008/0234899 A1* | 9/2008 | Breed | B60N 2/0232 701/47 |

(Continued)

OTHER PUBLICATIONS

Holt, J. et al., "Smart Widow System Including Energy Storage Unit and Methods of Using Same," Corresponding U.S. Appl. No. 16/406,362, filed May 8, 2019.

*Primary Examiner* — Mohammed A Hasan
(74) *Attorney, Agent, or Firm* — The Marbury Law Group PLLC

(57) ABSTRACT

Various embodiments may include methods of controlling a temperature of an electrochromic device. The methods may include determining a current temperature of the electrochromic device which includes a first transparent conductor electrically connected to a working electrode, and a second transparent conductor electrically connected to a counter electrode, and applying the heating current to the first transparent conductor and the second transparent conductor if the current temperature is below a minimum temperature to heat the electrochromic device. Further embodiments may include an electrochromic system including an electrochromic device and a controller configured to control the temperature of the electrochromic device.

13 Claims, 7 Drawing Sheets

(56) References Cited

U.S. PATENT DOCUMENTS

2013/0107345 A1* 5/2013 Kailasam .............. C23C 14/185
                                                   359/275
2017/0219906 A1   8/2017 Garcia et al.
2018/0231861 A1* 8/2018 Franz ........................ H02J 7/35

* cited by examiner

TEMPERATURE CONTROL FOR ELECTROCHROMIC DEVICES

FIELD

The present invention is generally directed to electrochromic devices, and more particularly to controlling and maintaining the temperature of an electrochromic device.

BACKGROUND

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. An electrochromic (EC) window coating overcomes these limitations by enhancing the window performance in all climates. EC window coatings undergo a reversible change in optical properties when driven by an applied potential. Some EC devices may include a working electrode, a solid state electrolyte, and a counter electrode sandwiched between two transparent conductor layers and an outer glass layer. The working electrode may include nanocrystalline structures or amorphous metal oxide nanoparticles such as $WO_3$, $CS_xWO_3$, $NbO_x$, $TiO_2$, $MoO_3$, $NiO_2$, and $V_2O_5$.

SUMMARY

Various embodiments may include methods of controlling a temperature of an electrochromic device. The methods may include determining a current temperature of the electrochromic device which includes a first transparent conductor electrically connected to a working electrode, and a second transparent conductor electrically connected to a counter electrode, and applying the heating current to the first transparent conductor and the second transparent conductor if the current temperature is below a minimum temperature to heat the electrochromic device.

In another embodiment, an electrochromic system comprises an electrochromic device, comprising a working electrode, a counter electrode, an electrolyte between the working electrode and the counter electrode, a first transparent conductor in contact with the working electrode, and a second transparent conductor in contact with the counter electrode. The system further comprises a first constant current source electrically connected to and configured to apply the heating current to the first transparent conductor, and a second constant current source electrically connected to and configured to apply the heating current to the second transparent conductor.

In various embodiments, provided is an automobile comprising: a window; and an electrochromic system comprising: an electrochromic device disposed on the window; and a controller configured to control heating of the electrochromic device, such that the electrochromic device is heated to a temperature of greater than 0° C. during operation of the automobile. The electrochromic device may comprise: a working electrode; a counter electrode; an electrolyte between the working electrode and the counter electrode; a first transparent conductor contacting with the working electrode; and a second transparent conductor contacting the counter electrode.

In various embodiments, provided is a method of controlling a temperature of an electrochromic device located in a window of an automobile, comprising determining if the temperature of the electrochromic device is less than a minimum temperature; and heating the electrochromic device to a temperature above the minimum temperature when the determined temperature is less than the minimum temperature during operation of the automobile.

DETAILED DESCRIPTION OF THE EMBODIMENTS

Electrochromic devices may be exposed to a wide range of temperatures when deployed. For example, electrochromic glass installed on the outside of buildings may be exposed to a wide range of temperatures and weather conditions, ranging from extreme heat to extreme cold. Electrochromic devices may have a temperature range in which they operate normally. If the electrochromic device is exposed to temperatures outside normal operating temperatures, the operation of the electrochromic device may be compromised. For example, the ionic conductivity of the electrolytes in the electrochromic device may be affected by temperature, which may affect the switching time of the electrochromic device. Specifically, as the temperature of the electrochromic device decreases, the ionic conductivity may decrease, which increases the switching time.

Various embodiments described herein may mitigate the effect of temperature on the operation of an electrochromic device. Specifically, control circuitry may be used to heat an electrochromic device if the temperature of the electrochromic device drops below a predetermined minimum temperature. For example, a microprocessor or a microcontroller may measure the temperature of the electrochromic device. The controller may also measure at least one temperature differential between a working electrode and a counter electrode of the electrochromic device (i.e., an inter-electrode voltage). The controller may determine a heating current to be applied to each of the transparent conductors of the electrochromic device based on the current temperature. When the heating current is applied to the transparent conductors, the resistivity of the transparent conductors causes the transparent conductor, and therefore the electrolyte of the electrochromic device to heat up. This allows the controller to warm up the electrochromic device. In addition, less lithium salt and ionic liquid components may be used in the electrolyte because the controller maintains the temperature above the minimum temperature. These compounds are relatively expensive, so a system that controls the heat of the electrochromic device may reduce the cost of manufacturing the electrochromic device.

Application of the heating current to the electrodes may affect the inter-electrode voltage between the working electrode and the counter electrode. The controller may also control the working current applied between the electrodes of the electrochromic device to maintain the inter-electrode voltage at a desired level. This allows the controller to maintain normal operation by controlling the inter-electrode voltage so that is it not affected b y the heating current.

Figure 1A:
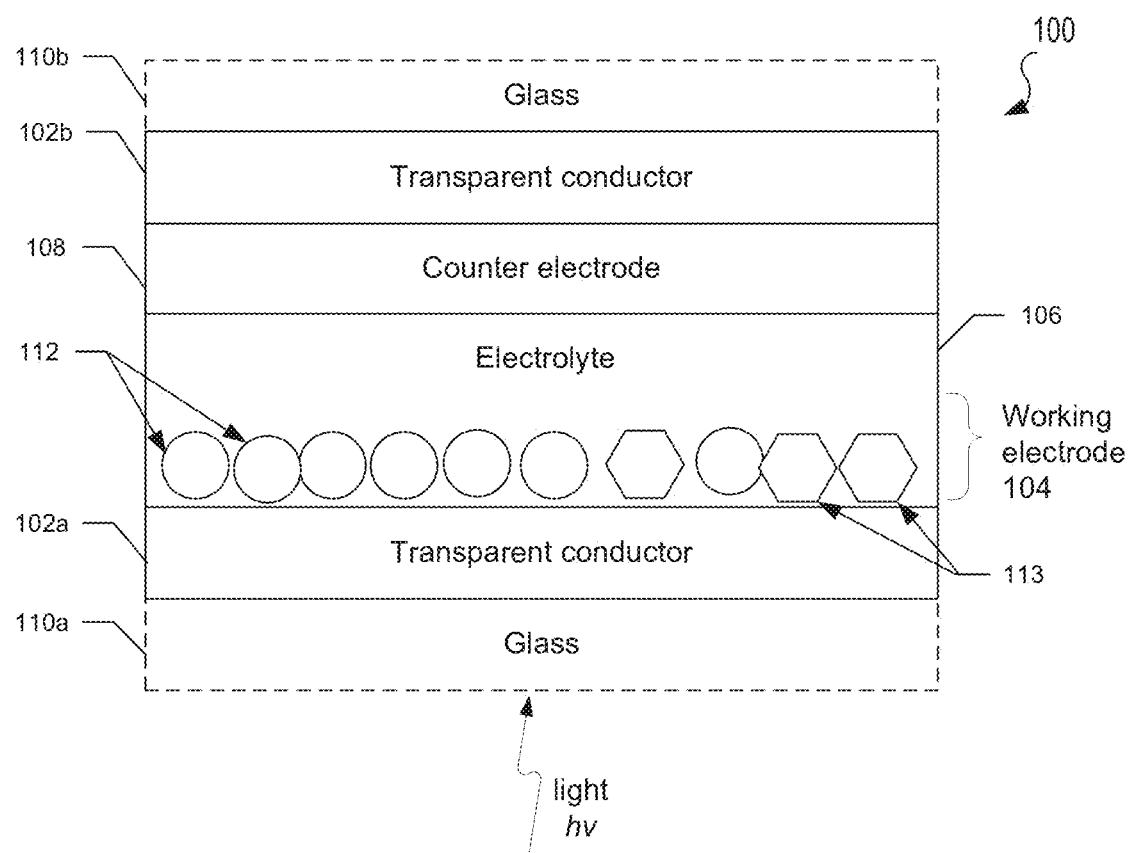
FIGS. 1A-1C are schematic representations of electrochromic devices according to various embodiments.
Figure 1B:
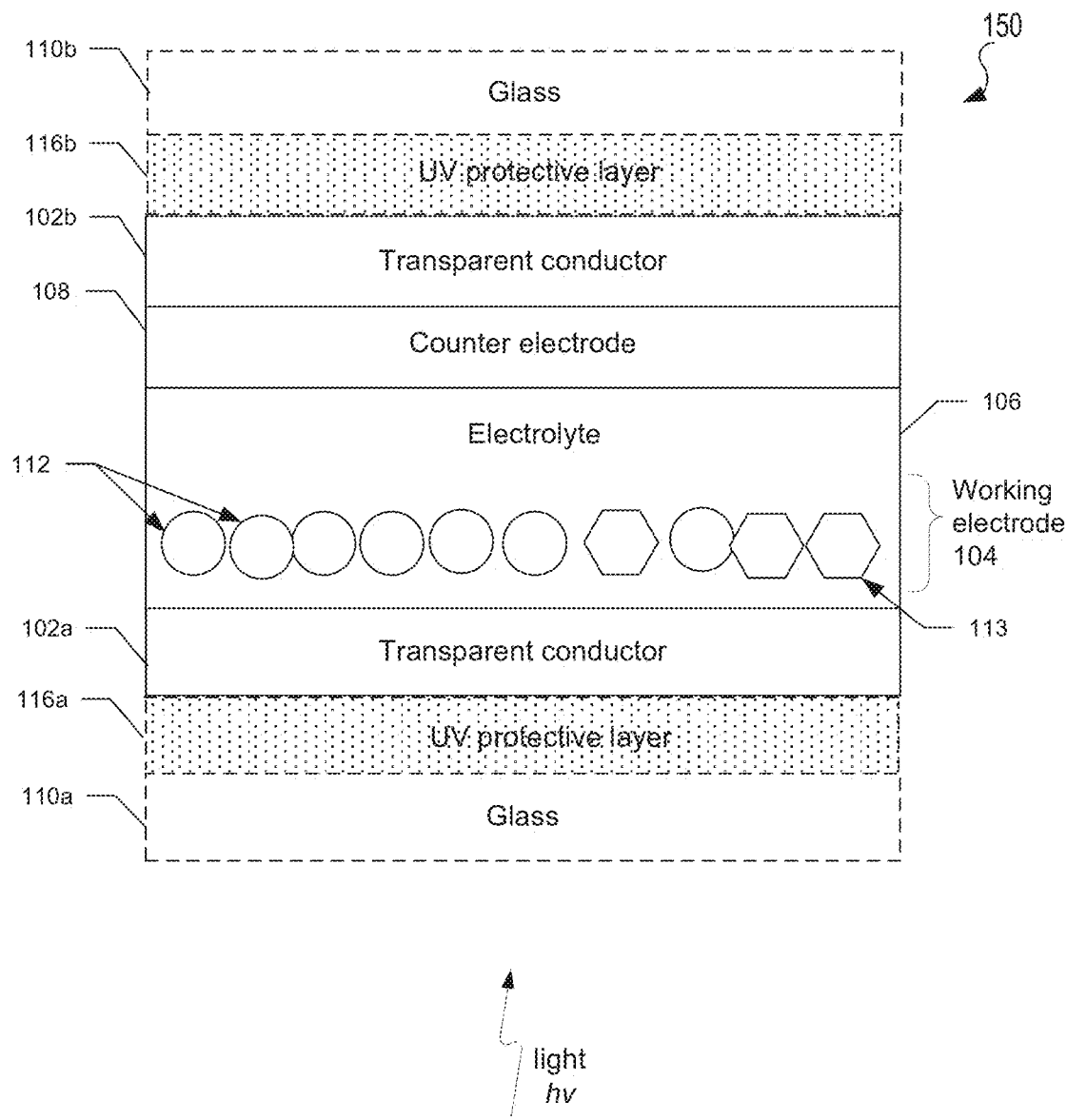
Figure 1C:
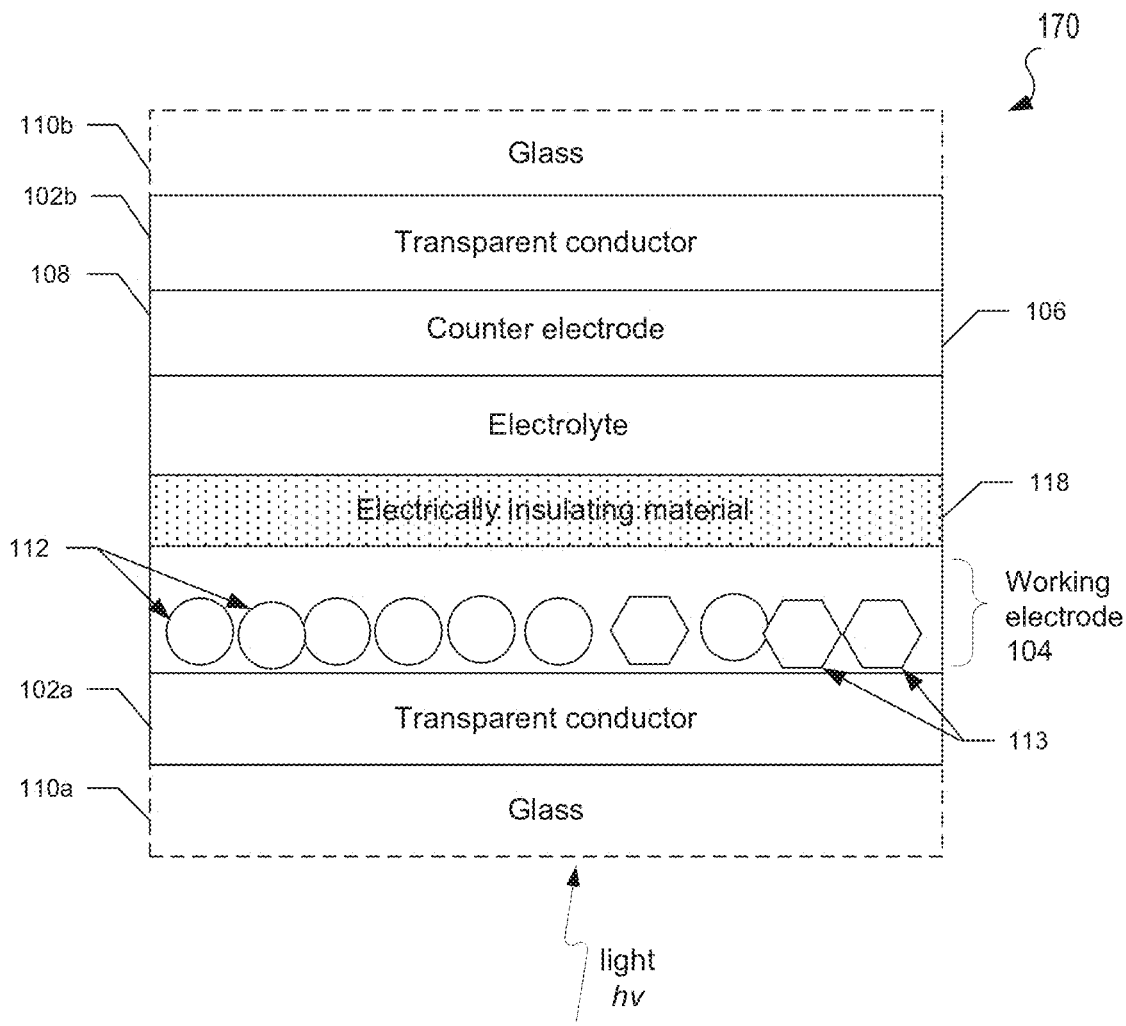

FIGS. 1A-1C illustrate embodiment electrochromic devices. It should be noted that such electrochromic devices may be oriented upside down or sideways from the orientations illustrated in FIGS. 1A-1C. Furthermore, the thickness of the layers and/or size of the components of the devices in FIGS. 1A-1C are not drawn to scale or in actual proportion to one another other, but rather are shown as representations.

In FIG. 1A, an embodiment electrochromic device 100 may include a first transparent conductor layer 102a, a working electrode 104, a solid state electrolyte 106, a counter electrode 108, and a second transparent conductor layer 102b. Some embodiment electrochromic devices may also include one or more optically transparent layers, such as a transparent layer 110a positioned in front of the first transparent conductor layer 102a and/or a transparent layer 110b positioned behind the second transparent conductor layer 102b. The transparent layers 110a, 110b may be formed of transparent materials such as plastic or glass.

The first and second transparent conductor layers 102a, 102b may be formed from transparent conducting films fabricated using inorganic and/or organic materials. For example, the transparent conductor layers 102a, 102b may include inorganic films of transparent conducting oxide (TCO) materials, such as indium tin oxide (ITO) or fluorine doped tin oxide (FTO). In other examples, organic films in transparent conductor layers 102a, 102b may include graphene and/or various polymers.

In the various embodiments, the working electrode 104 may include nanostructures 112 of a doped or undoped transition metal oxide bronze, and optionally nanostructures 113 of a transparent conducting oxide (TCO) composition shown schematically as circles and hexagons for illustration purposes only. As discussed above, the thickness of the layers of the device 100, including and the shape, size and scale of nanostructures is not drawn to scale or in actual proportion to each other, but is represented for clarity. In the various embodiments, nanostructures 112, 113 may be embedded in an optically transparent matrix material or provided as a packed or loose layer of nanostructures exposed to the electrolyte.

In the various embodiments, the doped transition metal oxide bronze of nanostructures 112 may be a ternary composition of the type AxMzOy, where M represents a transition metal ion species in at least one transition metal oxide, and A represents at least one dopant. Transition metal oxides that may be used in the various embodiments include, but are not limited to any transition metal oxide which can be reduced and has multiple oxidation states, such as niobium oxide, tungsten oxide, molybdenum oxide, vanadium oxide, titanium oxide and mixtures of two or more thereof. In one example, the nanostructured transition metal oxide bronze may include a plurality of tungsten oxide ($WO_{3-x}$) nanoparticles, where $0 \leq x \leq 0.33$, such as $0 \leq x \leq 0.1$.

In various embodiments, the at least one dopant species may be a first dopant species that, upon application of a particular first voltage range, causes a first optical response. The applied voltage may be, for example, a negative bias voltage. Specifically, the first dopant species may cause a surface plasmon resonance effect on the transition metal oxide by creating a significant population of delocalized electronic carriers. Such surface plasmon resonance may cause absorption of NIR radiation at wavelengths of around 780-2000 nm, with a peak absorbance at around 1200 nm. In various embodiments, the specific absorbances at different wavelengths may be varied/adjusted based other factors (e.g., nanostructure shape, size, etc.), discussed in further detail below. In the various embodiments, the first dopant species may be an ion species selected from the group of cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium).

In various embodiments, the dopant may include a second dopant species that causes a second optical response based upon application of a voltage within a different, second particular range. The applied voltage may be, for example, a negative bias voltage. In an embodiment, the second dopant species may migrate between the solid state electrolyte 106 and the nanostructured transition metal oxide bronze of the working electrode 104 as a result of the applied voltage. Specifically, the application of voltage within the particular range may cause the second dopant species to intercalate and deintercalate the transition metal oxide structure. In this manner, the second dopant may cause a change in the oxidation state of the transition metal oxide, which may cause a polaron effect and a shift in the lattice structure of the transition metal oxide. This shift may cause absorption of visible radiation, for example, at wavelengths of around 400-780 nm.

In various embodiments, the second dopant species may be an intercalation ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In various embodiments, nanostructures 113 may optionally be mixed with the doped transition metal oxide bronze nanostructures 112 in the working electrode 104. In the various embodiments, the nanostructures 113 may include at least one TCO composition, which prevents UV radiation from reaching the electrolyte and generating electrons. In an example embodiment, the nanostructures 113 may include an indium tin oxide (ITO) composition, which may be a solid solution of around 60-95 wt % (e.g., 85-90 wt %) indium(III) oxide ($In_2O_3$) and around 5-40 wt % (e.g., 10-15 wt %) tin(IV) oxide ($SnO_2$). In another example embodiment, the nanostructures 113 may include an aluminum-doped zinc oxide (AZO) composition, which may be a solid solution of around 99 wt % zinc oxide (ZnO) and around 2 wt % aluminum(III) oxide ($Al_2O_3$). Additional or alternative TCO compositions that may be used to form nanostructures 113 in the various embodiments include, but are not limited to, indium oxide, zinc oxide and other doped zinc oxides such as gallium-doped zinc oxide and indium-doped zinc oxide.

The TCO composition of nanostructures 113 may be transparent to visible light and, upon application of the first voltage, may modulate absorption of NIR radiation at wavelengths of around 1200-2500 nm, with peak absorbance around 2000 nm (e.g., at a longer peak wavelength than the bronze nanoparticles 112, but with overlapping absorption bands). In particular, application of the first voltage may cause an increase in free electron charge carriers, and therefore cause a surface plasmon resonance effect in at least one TCO composition of nanostructures 113. In an embodiment in which the TCO composition is ITO, the surface plasmon resonance effect may be caused by oscillation of free electrons produced by the replacement of indium ions ($In^{3+}$) with tin ions ($Sn^{4+}$). Similar to the transition metal oxide bronze, such surface plasmon resonance may cause a change in absorption properties of the TCO material. In some embodiments, the change in absorption properties may be an increase in absorbance of NIR radiation at wavelengths that overlaps with that of the nanostructures 112. Therefore, the addition of TCO composition nanostructures 113 to the working electrode 104 may serve to expand the range of NIR radiation absorbed (e.g., at wavelengths of around 780-2500 nm) compared to that of the nanostructures 112 alone (e.g., at wavelengths of around 780-2000 nm), and to enhance absorption of some of that NIR radiation (e.g., at wavelengths of around 1200-2000 nm).

Based on these optical effects, the nanostructure 112 and optional nanostructure 113 of the working electrode may progressively modulate transmittance of NIR and visible radiation as a function of applied voltage by operating in at least three different modes. For example, a first mode may be a highly solar transparent ("bright") mode in which the working electrode 104 is transparent to NIR radiation and visible light radiation. A second mode may be a selective-IR blocking ("cool") mode in which the working electrode 104 is transparent to visible light radiation but absorbs NIR radiation. A third mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the cool mode, blocking transmittance of NIR radiation at wavelengths of around 780-2500 nm. In another example, application of a second negative bias voltage having a higher absolute value than the first voltage may cause the electrochromic device to operate in the dark state, blocking transmittance of visible radiation (e.g., at wavelengths of around 400-780 nm) and NIR radiation at wavelengths of around 780-1200 nm. In another example, application of a third voltage having a positive bias may cause the electrochromic device to operate in the bright state, allowing transmittance of radiation in both the visible and NIR spectral regions. In various embodiments, the applied voltage may be between −5V and 5V, preferably between −2V and 2V. For example, the first voltage may be −0.25V to −0.75V, and the second voltage may be −1V to −2V. In another example, the absorbance of radiation at a wavelength of 800-1500 nm by the electrochromic device may be at least 50% greater than its absorbance of radiation at a wavelength of 450-600 nm.

Alternatively, the nanostructure 112 and optional nanostructure 113 of the working electrode may modulate transmittance of NIR and visible radiation as a function of applied voltage by operating in two different modes. For example, a first mode may be a highly solar transparent ("bright") mode in which the working electrode 104 is transparent to NIR radiation and visible light radiation. A second mode may be a visible blocking ("dark") mode in which the working electrode 104 absorbs radiation in the visible spectral region and at least a portion of the NIR spectral region. In an example, application of a first voltage having a negative bias may cause the electrochromic device to operate in the dark mode, blocking transmittance of visible and NIR radiation at wavelengths of around 780-2500 nm. In another example, application of a second voltage having a positive bias may cause the electrochromic device to operate in the bright mode, allowing transmittance of radiation in both the visible and NIR spectral regions. In various embodiments, the applied voltage may be between −2V and 2V. For example, the first voltage may be −2V, and the second voltage may be 2V.

In various embodiments, the solid state electrolyte 106 may include at least a polymer material and a plasticizer material, such that electrolyte may permeate into crevices between the transition metal oxide bronze nanoparticles 112 (and/or nanoparticles 113 if present). The term "solid state," as used herein with respect to the electrolyte 106, refers to a polymer-gel and/or any other non-liquid material. In some embodiments, the solid state electrolyte 106 may further include a salt containing, for example, an ion species selected from the group of lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In an example embodiment, such salt in the solid state electrolyte 106 may contain a lithium and/or sodium ions. In some embodiments, the solid state electrolyte 106 may initially contain a solvent, such as butanol, which may be evaporated off once the electrochromic device is assembled. In some embodiments, the solid state electrolyte 106 may be around 40-60 wt % plasticizer material, preferably around 50-55 wt % plasticizer material. In an embodiment, the plasticizer material may include at least one of tetraglyme and an alkyl hydroperoxide. In an embodiment, the polymer material of the solid state electrolyte 106 may be polyvinylbutyral (PVB), and the salt may be lithium bis(trifluoromethane). In other embodiments, the solid state electrolyte 106 may include at least one of lithium phosphorus oxynitride (LiPON) and tantalum pentoxide ($Ta_2O_5$).

In some embodiments, the electrolyte 106 may include a sacrificial redox agent (SRA). Suitable classes of SRAs may include, but are not limited to, alcohols, nitrogen heterocycles, alkenes, and functionalized hydrobenzenes. Specific examples of suitable SRAs may include benzyl alcohol, 4-methylbenzyl alcohol, 4-methoxybenzyl alcohol, dimethylbenzyl alcohol (3,5-dimethylbenzyl alcohol, 2,4-dimethylbenzyl alcohol etc.), other substituted benzyl alcohols, indoline, 1,2,3,4-tetrahydrocarbazole, N,N-dimethylaniline, 2,5-dihydroanisole, etc. In various embodiments, the SRA molecules may create an air stable layer that does not require an inert environment to maintain charge.

Polymers that may be part of the electrolyte 106 may include, but are not limited to, poly(methyl methacrylate) (PMMA), poly(vinyl butyral-co-vinyl alcohol-co-vinyl acetate) (PVB), poly(ethylene oxide) (PEO), fluorinated co-polymers such as poly(vinylidene fluoride-co-hexafluoropropylene), poly(acrylonitrile) (PAN), poly(vinyl alcohol) (PVA), etc. Plasticizers that may be part of the polymer electrolyte formulation include, but are not limited to, glymes (tetraglyme, triglyme, diglyme etc.), propylene carbonate, ethylene carbonate, ionic liquids (1-ethyl-3-methylimidazolium tetrafluoroborate, 1-butyl-3-methylimidazolium hexafluorophosphate, 1-butyl-3-methylimidazolium bis(trifluoromethane sulfonyl) imide, 1-butyl-1-methyl-pyrrolidinium bis(trifluoromethane sulfonyl)imide, etc.), N,N-dimethylacetamide, and mixtures thereof.

In some embodiments, the electrolyte 106 may include, by weight, 10-30% polymer, 40-80% plasticizer, 5-25% lithium salt, and 0.5-10% SRA.

The counter electrode 108 of the various embodiments should be capable of storing enough charge to sufficiently balance the charge needed to cause visible tinting to the nanostructured transition metal oxide bronze in the working electrode 104. In various embodiments, the counter electrode 108 may be formed as a conventional, single component film, a nanostructured film, or a nanocomposite layer.

In some embodiments, the counter electrode 108 may be formed from at least one passive material that is optically transparent to both visible and NIR radiation during the applied biases. Examples of such passive counter electrode materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, and/or $V_2O_5$. In other embodiments the counter electrode 108 may be formed from at least one complementary material, which may be transparent to NIR radiation but which may be oxidized in response to application of a bias, thereby causing absorption of visible light radiation. Examples of such complementary counter electrode materials may include $Cr_2O3$, $MnO_2$, $FeO_2$, $CoO_2$, $NiO_2$, $RhO_2$, or $IrO_2$. The counter electrode materials may include a mixture of one or more passive materials and/or one or more complementary materials described above.

Without being bound to any particular theory, it is believed that the application of a first voltage in the various embodiments may cause the interstitial dopant species (e.g., cesium) in the crystal structure of the transition metal oxide bronze to have a greater amount of free carrier electrons and/or to cause the interstitial dopant species (e.g., lithium ions from the electrolyte) to perform non-faradaic capacitive or pseudo-capacitive charge transfer on the surface of the nanostructures 112, which may cause the surface plasmon resonance effect to increase the absorption of NIR radiation. In this manner, the absorption properties of the transition metal oxide bronze characteristics may change (i.e., increased absorption of NIR radiation) upon application of the first voltage. Further, application of a second voltage having a higher absolute value than the first voltage in the various embodiments may cause faradaic intercalation of an intercalation dopant species (e.g., lithium ions) from the electrolyte into the transition metal oxide nanostructures. It is believed that the interaction of this dopant species provides interstitial dopant atoms in the lattice which creates a polaron effect. In this manner, the lattice structure of transition metal oxide nanoparticles may experience a polaron-type shift, thereby altering its absorption characteristics (i.e., shift to visible radiation) to block both visible and near infrared radiation.

In some embodiments, in response to radiation of certain spectral regions, such as UV (e.g., at wavelengths of around 10-400 nm) may cause excitons to be generated in the polymer material of the solid state electrolyte 106. The UV radiation may also excite electrons in the doped transition metal oxide bronze to move into the conduction band, leaving holes in the valence band. The generated excitons in the polymer material may dissociate to free carriers, the electrons of which may be attracted to the holes in the valence band in the doped transition metal oxide bronze (e.g., cesium-doped tungsten trioxide ($Cs_xWO_3$)) of nanoparticles 112. Since electrochemical reduction of various transition metal oxide bronzes by such free electron charge carriers may degrade their performance (i.e., from unwanted coloration of the transition metal oxide bronze), embodiment devices may include one or more layer of a protective material to prevent UV radiation from reaching the solid state electrolyte 106, in addition to or instead of nanostructures 113 mixed into the working electrode.

FIG. 1B illustrates an embodiment electrochromic device 150 that addresses degradation of the doped transition metal oxide bronze nanostructures 112. Similar to device 100 shown in FIG. 1A, device 150 may include a first transparent conductor layer 102a, a working electrode 104, a solid state electrolyte 106, a counter electrode 108, a second transparent conductor layer 102b, and optically transparent layers 110a, 110b. In addition, device 150 may include one or more protective layers 116a, 116b made of a material that absorbs UV radiation. In an example embodiment, the UV protective layer 116a may be placed between the transparent conductor 102a and the transparent layer 110a on one side of the device 150, while the UV protective layer 116b may be placed between the transparent conductor 102b and the transparent layer 110b on the other side of the device 150. Alternatively, the device 150 may include a first protective layer 116a positioned in front of the first transparent conductor layer 102a. For example, the first protective layer 116a may be positioned between the first transparent conductor layer 102a and, if present, the protective layer 116b may be disposed on the transparent layer 110b. Alternatively, if present, the first protective layer 116a may be positioned in front of the transparent layer 110a (i.e., on the side of the conductor layer 102a or transparent layer 110a). In another example embodiment, the device 150 may additionally or alternatively provide a protective layer that is positioned between the first transparent conductor layer 102a and the working electrode 104.

The UV radiation absorbing material of the one or more protective layers 116a, 116b of the various embodiments may be any of a number of barrier films. For example, the one or more protective layer 116a may be a thin film of at least one TCO material, which may include a same as or different from TCO compositions in the nanostructures 113. In an example embodiment, a protective layer 116a of the device 150 may be an ITO thin film, and therefore capable of absorbing UV radiation by band-to-band absorption (i.e., absorption of a UV photon providing enough energy to excite an electron from the valence band to the conduction band). In another example embodiment, the device may include the TCO nanostructures 113 made of ITO, as well as a protective layer 116a composed of an ITO thin film. Alternatively, the TCO nanostructures 113 may form a separate thin film layer disposed between the transition metal oxide bronze nanoparticles 112 and the transparent conductor 102a. In some embodiments, the UV radiation absorbing materials of protective layers 116a, 116b may include organic or inorganic laminates.

In another embodiment, at least one UV protective layer, such as protective layer 116a in FIG. 1B, may be a UV radiation reflector made of a high index transparent metal oxide. Since birds can see radiation in the UV range, a UV reflector may be implemented in embodiments positioned as outside windows in order to prevent birds from hitting the windows. In some other embodiments, UV radiation absorbing organic molecules and/or inorganic UV radiation absorbing nanoparticles (e.g., zinc oxide, indium oxide, ITO, etc.) may be incorporated within the electrolyte 106 material.

FIG. 1C illustrates another embodiment electrochromic device 170 that addresses degradation of the doped transition metal oxide bronze nanostructures 112 by controlling the effects of the electron charge carriers generated in the electrolyte from exposure to UV radiation. Similar to devices 100 and 150 discussed above with respect to FIGS. 1A and 1B respectively, device 170 may include a first transparent conductor layer 102a, a working electrode 104, a solid state electrolyte 106, a counter electrode 108, a second transparent conductor layer 102b, and one or more optically transparent support layer 110a, 110b. In addition, device 170 may include a protective layer 118 positioned between the working electrode 104 and the electrolyte 106. The protective layer 118 may be composed of one or more ionically conductive and electrically insulating material.

As discussed above, without being bound to any particular theory, it is believed that the migration of intercalation ions between the electrolyte 106 and the working electrode 104 is responsible for at least some of the device's capability to modulate spectral absorption. Therefore, in order to maintain operability of the device, the electrically insulating material used to form the protective layer 118 should also be ionically conductive. That is, the material of the protective layer 118 may prevent or reduce free electrons in the solid state electrolyte layer 106 from reducing the transition oxide bronze of nanoparticles 112, while allowing the diffusion of ions of an intercalation dopant species (e.g., Na, Li, etc.) between the electrolyte 106 and working electrode 104. In an example embodiment, the electrically insulating material that makes up the protective layer 118 may be tantalum oxide, such as tantalum pentoxide ($Ta_2O_5$), which blocks migration of electrons from the electrolyte 106 while allowing diffusion of the intercalation dopant species ions (e.g., lithium ions) from the electrolyte 106. In this manner, degradation of the transition metal oxide bronze is reduced or prevented by controlling the effect of the absorbed UV radiation in addition to or instead of instead of blocking its absorption. Other example materials that may be used to form the protective layer 118 in addition to or instead of tantalum pentoxide may include, without limitation, strontium titanate ($SrTiO_3$), zirconium dioxide ($ZrO_2$), indium oxide, zinc oxide, tantalum carbide, niobium oxide, and various other dielectric ceramics having similar electrical and/or crystalline properties to tantalum pentoxide.

In an alternative embodiment, instead of or in addition to the protective layer 118, the nanostructures 112 may each be encapsulated in a shell containing an electrically insulating and ionically conductive material, which may be the same as or different from the material of the protective layer 118 (e.g., tantalum oxide, strontium titanate, zinc oxide, indium oxide, zirconium oxide, tantalum carbide, or niobium oxide).

In an example embodiment, each nanostructure 112 may have a core of cubic or hexagonal unit cell lattice structure tungsten bronze, surrounded by a shell of tantalum pentoxide.

In some embodiments, the electrolyte 106 may include a polymer that reduces damage to the device due to UV radiation. The polymer may be any of a number of polymers that are stable upon absorption of UV radiation (e.g., no creation of proton/electron pairs). Examples of such polymers may include, but are not limited to, fluorinated polymers without hydroxyl (—OH) groups (e.g., polyvinylidene difluoride (PVDF)).

In another embodiment, a positive bias may be applied to the counter electrode 108 to draw UV radiation generated electrons from the electrolyte 106 to the counter electrode 108 in order to reduce or prevent electrons from the electrolyte 106 from moving to the working electrode 104 to avoid the free electron-caused coloration of the doped transition metal oxide bronze in the working electrode 104.

In another embodiment, a device may include more than one of, such as any two of, any three of, or all four of: (i) a protective layer of electrically insulating material (e.g., protective layer 118 or protective material shells around the bronze nanoparticles), (ii) one or more protective layer of UV radiation absorbing material (e.g., protective layer(s) 116a and/or 116b in FIG. 1B and/or UV radiation absorbing organic molecules and/or inorganic UV radiation absorbing nanoparticles incorporated within the electrolyte 106 material), (iii) electrolyte polymer that is stable upon absorption of UV radiation, and/or (iv) application of positive bias to the counter electrode 108. In various embodiments, the nanostructures 113 may be included in or omitted from electrochromic devices 150, 170.

In another embodiment, the protective layer(s) 116a and/or 116b may comprise a stack of metal oxide layers. Alternatively, the stack may comprise a separate component that is provided instead of or in addition to the layer(s) 116a and/or 116b. The stack may provide improvement in the reflected color of the electrochromic device. Prior art devices generally have a reddish/purplish color when viewed in reflection. The stack may comprise index-matched layers between the glass and transparent conductive oxide layer to avoid the reddish/purplish reflected color. As noted above, the index-matched layer can serve as the UV absorber or be used in addition to another UV absorber. The stack may comprise a zinc oxide based layer (e.g., ZnO or AZO) beneath an indium oxide based layer (e.g., indium oxide or ITO).

Compared to nanocomposite electrochromic films, the various embodiments may involve similar production by utilizing a single nanostructured material in the working electrode to achieve the desired spectral absorption control in both NIR and visible regions, and another nanostructured material to enhance and expand such control in the NIR region. Further, the various embodiments may provide one or more additional layer(s) of a protective material to minimize degradation of the single nanostructured material.

In some embodiments, the working electrode and/or the counter electrode may additionally include at least one material, such as an amorphous nano structured material, that enhances spectral absorption in the lower wavelength range of the visible region. In some embodiments, the at least one amorphous nanostructured material may be at least one nanostructured amorphous transition metal oxide.

In particular, the amorphous nano structured materials may provide color balancing to the visible light absorption that may occur due to the polaron-type shift in the spectral absorption of the doped-transition metal oxide bronze. As discussed above, upon application of the second voltage having a higher absolute value, the transition metal oxide bronze may block (i.e., absorb) radiation in the visible range. In various embodiments, the absorbed visible radiation may have wavelengths in the upper visible wavelength range (e.g., 500-700 nm), which may cause the darkened layer to appear blue/violet corresponding to the un-absorbed lower visible wavelength range (e.g., around 400-500 nm). In various embodiments, upon application of the second voltage, the at least one nanostructured amorphous transition metal oxide may absorb complementary visible radiation in the lower visible wavelength range (e.g., 400-500 nm), thereby providing a more even and complete darkening across the visible spectrum with application of the second voltage. That is, use of the amorphous nanostructured material may cause the darkened layer to appear black.

In some embodiments, at least one nanostructured amorphous transition metal oxide may be included in the working electrode 104 in addition to the doped-transition metal oxide bronze nanostructures 112 and the optional TCO nanostructures 113. An example of such material in the working electrode 104 may be, but is not limited to, nanostructured amorphous niobium oxide, such as niobium(II) monoxide (NbO) or other niobium oxide materials (e.g., $NbO_x$). In some embodiments, the counter electrode 108 may include, as a complementary material, at least one nanostructured amorphous transition metal oxide. That is, in addition to optically passive materials, the counter electrode 108 may include at least one material for color balancing (i.e., complementing) the visible radiation absorbed in the working electrode (i.e., by the transition metal oxide bronze). An example of such material in the counter electrode 108 may be, but is not limited to, nanostructured amorphous nickel oxide, such as nickel(II) oxide (NiO) or other nickel oxide materials (e.g., $NiO_x$).

In the various embodiments, nanostructures that form the working and/or counter electrode, including the at least one amorphous nanostructured material, may be mixed together in a single layer. An example of a mixed layer is shown in FIG. 1A with respect to transition metal oxide bronze nanostructures 112 and TCO nanostructures 113. Alternatively, nano structures that form the working and/or counter electrode, including the at least one amorphous nanostructured material, may be separately layered according to composition. For example, a working electrode may include a layer of amorphous $NbO_x$ nanostructures, a layer of transition metal oxide bronze nanostructures, and a layer of ITO nanostructures, in any of a number of orders.

The nanostructured transition metal oxide bronzes that may be part of the working electrode 104 in various embodiment devices can be formed using any of a number of low cost solution process methodologies. For example, solutions of $Nb:TiO_2$ and $Cs_xWO_3$ may be synthesized using colloidal techniques. Compared to other synthetic methodologies, colloidal synthesis may offer a large amount of control over the nanostructure size, shape, and composition of the nanostructured transition metal oxide bronze. After deposition, a nanostructured transition metal oxide bronze material in the working electrode 104 may be subjected to a thermal post treatment in air to remove and cap ligands on the surface of the nanostructures.

In various embodiments, nanostructured amorphous transition metal oxide materials may be formed at room temperature from an emulsion and an ethoxide precursor. For example, procedures used to synthesize tantalum oxide nanoparticles that are described in "Large-scale synthesis of bioinert tantalum oxide nanoparticles for X-ray computed tomography imaging and bimodal image-guided sentinel lymph node mapping" by M H Oh et al. (J Am Chem Soc. 2011 April 13; 133 (14):5508-15), incorporated by reference herein, may be similarly used to synthesize amorphous transition metal oxide nanoparticles. For example, an overall synthetic process of creating the nanoparticle, as described in Oh et al., may be adopted from the microemulsion synthesis of silica nanoparticles. In such process, a mixture of cyclohexane, ethanol, surfactant, and a catalyst for the sol-gel reaction may be emulsified. The ethoxide precursor may be added to the emulsion, and uniform nanoparticles may be formed by a controlled-sol gel reaction in the reverse micelles at room temperature within around 5 minutes. The sol-gel reaction may be catalyzed, for example, by NaOH.

In some embodiments, the nanostructured amorphous transition metal oxide may be sintered at a temperature of at least 400° C. for at least 30 minutes, such as 400 to 600° C. for 30 to 120 minutes to form a porous web. In an example embodiment, the porous web may be included in a working electrode 104, with the tungsten bronze nanoparticles and ITO nanoparticles incorporated in/on the web. Alternatively, the sintering step may be omitted and the nano structured amorphous transition metal oxide may remain in the device in the form of nanoparticles having amorphous structure. In this embodiment, the device containing the nanostructured amorphous transition metal oxide may include or may omit the protective layer(s) 116a, 116b, and 118, the UV stable electrolyte polymer, and the application of positive bias to the counter electrode.

Electrochromic responses of prepared nano structured transition metal oxide bronze materials (e.g., $Cs_xWO_3$, $Nb:TiO_2$, etc.) may be demonstrated by spectroelectrochemical measurements.

In various embodiments, the shape, size, and doping levels of nanostructured transition metal oxide bronzes may be tuned to further contribute to the spectral response by the device. For instance, the use of rod versus spherical nanostructures 112 may provide a wider level of porosity, which may enhance the switching kinetics. Further, a different range of dynamic plasmonic control may occur for nanostructures with multiple facets, such as at least 20 facets.

Various embodiments may also involve alternation of the nanostructures 112 that form the working electrode 104. For example, the nanostructures may be nanoparticles of various shapes, sizes and/or other characteristics that may influence the absorption of NIR and/or visible light radiation. In some embodiments, the nanostructures 112 may be isohedrons that have multiple facets, preferably at least 20 facets.

In some embodiments, the transition metal oxide bronze nanostructures 112 may be a combination of nanoparticles having a cubic unit cell crystal lattice ("cubic nanoparticles") and nanoparticles having a hexagonal unit cell crystal lattice ("hexagonal nanoparticles"). Each unit cell type nanoparticle contributes to the performance of the working electrode 104. For example, the working electrode 104 may include both cubic and hexagonal cesium doped tungsten oxide bronze nanoparticles. In alternative embodiments, the working electrode 104 may include either cubic or hexagonal cesium doped tungsten oxide nanoparticles. For example, the working electrode 104 may include cubic cesium-doped tungsten oxide (e.g. $Cs_1W_2O_{6\pm x}$) nanoparticles and amorphous niobium oxide nanoparticles or hexagonal cesium-doped tungsten oxide (e.g. $Cs_{0.29}W_1O_3$) nanoparticles without niobium oxide. In alternative embodiments, the working electrode 104 may include undoped tungsten oxide (e.g. $WO_{3-x}$) nanoparticles where $0 \leq x \leq 0.33$, such as $0 \leq x \leq 0.17$, including $0 \leq x \leq 0.1$.

For example, upon application of the first (i.e., lower absolute value) voltage described above, the hexagonal bronze nanostructures 112 may block NIR radiation having wavelengths in the range of around 800-1700 nm, with the peak absorption at the mid-NIR wavelength of around 1100 nm. The cubic bronze nanostructures 112 may block NIR radiation having wavelengths in the close-NIR range with the peak absorption of around 890 nm. The indium oxide based (including ITO) and/or zinc oxide based (including AZO) nanostructures 113 may be included in the working electrode 104 to block the higher wavelength IR radiation upon application of the first voltage. Thus, the cubic bronze and hexagonal bronze nanostructures may block respective close and mid-NIR radiation (e.g., using the Plasmon effect), while the nanostructures 113 may block the higher wavelength IR radiation.

Upon application of the second (i.e., higher absolute value) voltage described above, the cubic bronze nanostructures 112 may block visible and NIR radiation having wavelengths in the range of around 500-1500 nm, with the peak absorption at the close-NIR wavelength of around 890 nm (e.g., using the polaron effect). Optionally, the amorphous niobium oxide may also be added to the working electrode 104 to block the short wavelength visible radiation (e.g., 400 to 500 nm wavelength).

The cubic bronze nanostructures block visible radiation via the polaron effect at a lower applied voltage than the hexagonal bronze nanostructures. Thus, the second voltage may have an absolute value which is below the value at which the hexagonal bronze nano structures block visible radiation via the polaron effect such that these nanostructures do not contribute to blocking of visible radiation. Alternatively, the second voltage may have an absolute value which is above the value at which the hexagonal bronze nanostructures block visible radiation via the polaron effect such that these nanostructures also contribute to blocking of visible radiation.

Embodiment nanoparticles that form the working electrode 104 may be around 4-6 nm in diameter, and may include 40 to 70 wt %, such as around 50 wt % cubic tungsten bronze nanostructures, 15 to 35 wt %, such as around 25 wt % hexagonal tungsten bronze nanostructures, and optionally 15 to 35 wt %, such as around 25 wt % ITO nanostructures. In some embodiments, in order to achieve color balancing as described above, the nanoparticles that form the working electrode 104 may optionally include around 5-10 wt % amorphous $NbO_x$ nanostructures in place of cubic tungsten bronze nanostructures. In this embodiment, the device containing two types of bronze nanoparticles may include or may omit the protective layer(s) 116a, 116b, and 118, the UV stable electrolyte polymer, the application of positive bias to the counter electrode, and the amorphous niobium oxide.

In summary, the working electrode 104 may include one or more of the following components:
(a) metal oxide bronze nanostructures 112 having (i) a cubic, (ii) hexagonal, or (iii) a combination of cubic and hexagonal unit cell lattice structure;
(b) protective (i) indium oxide based (including ITO) and/or zinc oxide based (including AZO) nanostructures 113;
(c) amorphous niobium oxide nanoparticles and/or web; and/or
(d) additional nanostructures selected from undoped tungsten oxide, molybdenum oxide, titanium oxide, and/or vanadium oxide.

The counter electrode 108 may include one or more of the following components:
(a) passive electrode material selected from cerium(IV) oxide ($CeO_2$), titanium dioxide ($TiO_2$), cerium(III) vanadate ($CeVO_2$), indium(III) oxide ($In_2O_3$), tin-doped indium oxide, tin(II) oxide ($SnO_2$), manganese-doped tin oxide, antimony-doped tin oxide, zinc oxide (ZnO), aluminum-doped zinc oxide (AZO), iron(III) oxide ($Fe_2O_3$), and vanadium(V) oxide ($V_2O_5$);
(b) an active electrode material selected from chromium (III) oxide ($Cr_2O_3$), manganese dioxide ($MnO_2$), iron (II) oxide (FeO), cobalt oxide (CoO), nickel(II) oxide (NiO), rhodium(IV) oxide ($RhO_2$), and iridium(IV) oxide ($IrO_2$);
(c) amorphous nickel oxide nanoparticles and/or web; and/or
(d) conductivity enhancer nanoparticles selected from indium oxide, ITO, and zinc oxide.

While the various embodiments are described with respect to electrochromic windows, the embodiment methods, systems, and devices may also be used in materials for other types of smart windows. Such smart windows may include, but are not limited to, polymer-dispersed liquid crystals (PLDD), liquid crystal displays (LCDs), thermochromics, etc.

TEMPERATURE CONTROL FOR ELECTROCHROMIC DEVICES

Figure 2:
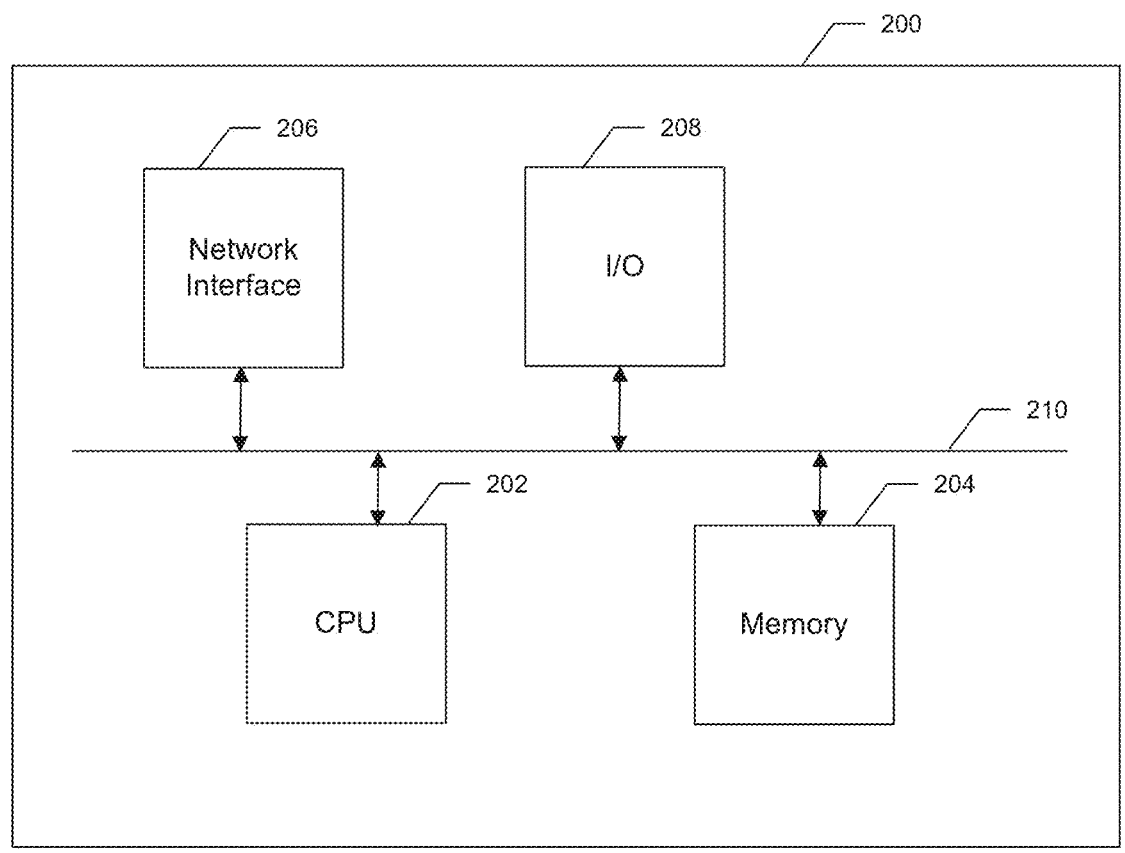
FIG. 2 is a block diagram of a controller for an electrochromic device according to various embodiments.

FIG. 2 illustrates a block diagram of a controller 200 for an electrochromic device according to various embodiments. The controller 200 may include a central processing unit (CPU) 202 and memory 204. The CPU 202 may be a low power processor that processes software instructions for operating and controlling an electrochromic device. The memory 204 may include volatile and non-volatile memory such as RAM, ROM, and FLASH memory. The memory 204 may store various programs and applications for controlling the operation and temperature of the electrochromic device. For example, the controller 200 may be configured to compare the current temperature of an electrochromic device to a predetermined minimum temperature. If the current temperature is below the minimum temperature, the controller 200 may heat the electrochromic device by applying a heating current to the transparent conductors in the electrochromic device.

The controller 200 may include one or more input/output ports 208 for interfacing with the electrochromic device, various optional sensors (e.g., thermometers) connected to the electrochromic device, and other devices. The controller 200 may also include a network interface 206 for communicating with a wider network (e.g., a WAN). The network interface 206 may support wired and/or wireless connections to the network (e.g., a ZigBee® wireless module). The controller 200 may include a bus 210 that connects the various components of the controller 200 together. The controller 200 may also include various other components not illustrated in FIG. 2, such as a battery or other power source (e.g., electrical connection to a power grid) and a universal asynchronous receiver/transmitter (UART).

Figure 3:
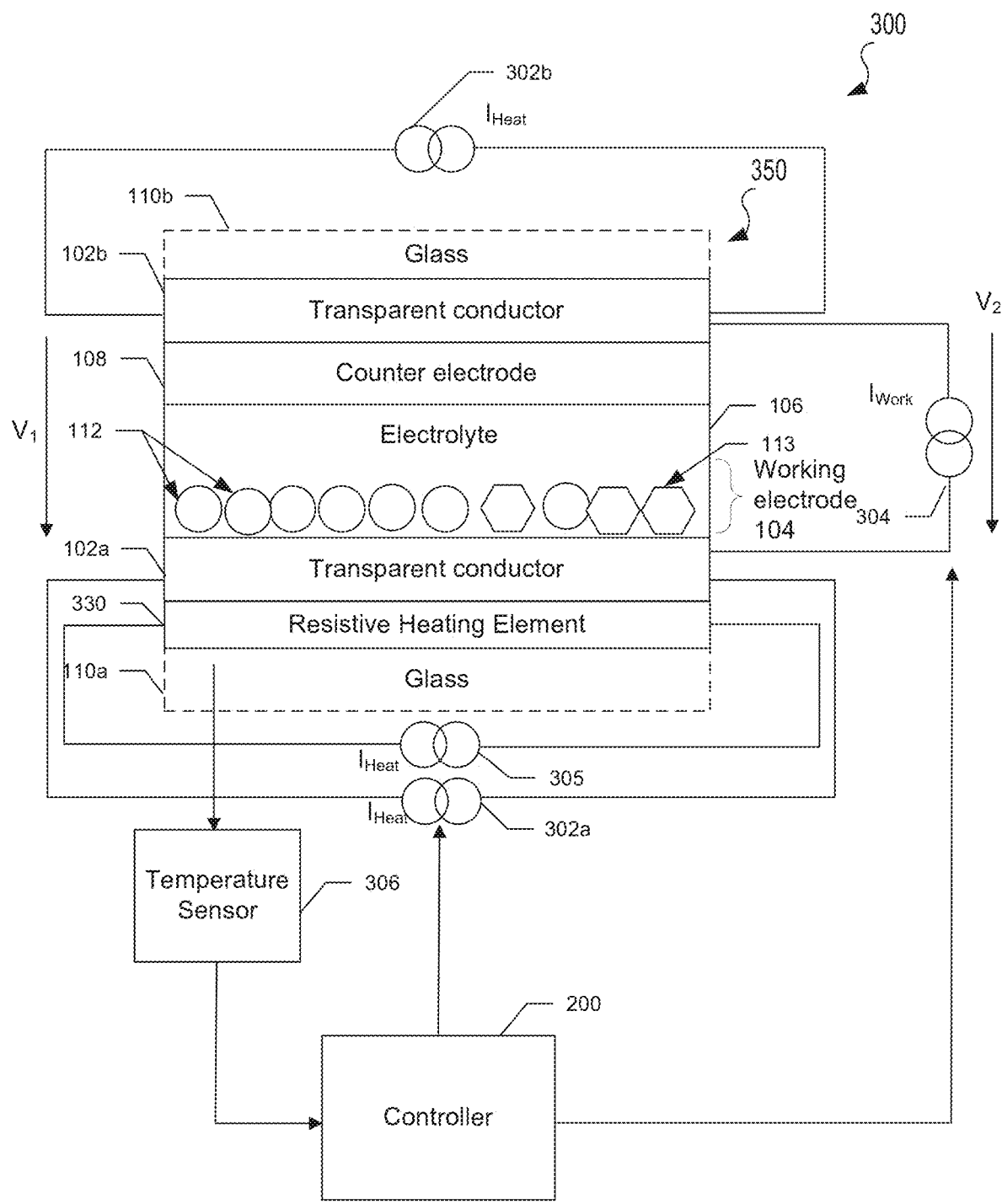
FIG. 3 illustrates a schematic diagram of an electrochromic system including a controller 200 connected to an electrochromic device, according to various embodiments of the present disclosure.

FIG. 3 illustrates a schematic diagram of an electrochromic system 300 including a controller 200 connected to an electrochromic device 350, according to various embodiments of the present disclosure. Referring to FIG. 3, the electrochromic device may be any of above-described electrochromic devices 100, 150, or 170. The controller 200 may be configured to control the temperature of the electrochromic device 350. An optional temperature sensor 306 may be used to measure the temperature of the electrochromic device 350. The temperature sensor 306 may be located on the electrochromic device 350, or may be part of the controller 200 if the controller 200 is located in proximity to the electrochromic device. Alternatively, the controller 200 may wirelessly receive temperature data (e.g., current weather conditions) from a remote source (e.g., a remote sensor or a weather data transmission source).

The controller 200 may also measure the inter-electrode voltage of the electrochromic device 350. For example, the controller may measure the voltage differential between the working electrode 104 and the counter electrode 108 on each end of the electrochromic device 350 (i.e., voltages $V_1$ and $V_2$ as illustrated in FIG. 3).

The controller 200 may be configured to maintain the temperature of the electrochromic device 350 above a predetermined minimum temperature. The minimum temperature may be hard-coded into the controller 200 or may be programmable by a device in communication with the controller 200 (e.g., a server connected to the controller 200 through the network interface 208). The controller 200 may obtain the current temperature of the electrochromic device 350 from the temperature sensor 306 and compare the current temperature to the minimum temperature.

In one embodiment, a separate direct current (e.g., constant current) source 302a, 302b may be electrically connected to each respective transparent conductor 102a, 102b. Thus, a direct (e.g., constant) current is applied to both the working electrode 104 and the counter electrode 108 through the respective transparent conductor 102a, 102b from a respective current source 302a, 302b. In another embodiment, a single direct (e.g., constant) current source may be used to heat both electrodes 104, 108.

In another embodiment, a third direct (e.g., constant) current source 304 may be used to provide the working (i.e., drive) current between the working electrode 104 and counter electrode 108 to change the state of the electrochromic device 350 from bright to dark or from dark to bright.

In still another embodiment, the system 300 may optionally include a resistive heater including a heating element 330 disposed on the transparent layer 110a. However, the heating element 330 may alternatively be disposed on transparent layer 110b. The heating element 330 may be connected to one of the current sources, such as current source 302a. In other embodiments, the heating element 330 may be connected to a fourth direct (e.g., constant) current source 305, such as a 12V power source. The heating element 330 may include multiple lines or wires disposed on either of the transparent layers 110a, 110b, similar to an automobile defrosting/defogging device. For example, the heating element 330 may include lines of a silver-ceramic material printed and baked onto the interior surface of either of the transparent layers 110a, 110b, or may be a series of very fine wires embedded therein.

If the current temperature is below the minimum temperature, the controller 200 may calculate the value of heating currents to be applied to the transparent conductors 102a, 102b and/or heating element 330 of the electrochromic device 350 from the respective current source 302a, 302b, 305. The controller 200 may be configured to apply a voltage to the transparent conductors 102a, 102b and/or heating element 330 for a set amount of time, such as from about 10 to about 15 minutes.

The value of the heating currents may be based on the current temperature. For example, the controller 200 may utilize PID or another control loop feedback mechanism to determine the value of the heating currents applied to each transparent conductor 102a, 102b. When the heating currents are applied to the transparent conductors 102a, 102b, heat is generated at a rate of $I^2R$ Watts (or J/s), where I is the heating current and R is the resistance of the transparent conductor 102a, 102b. As an example, for an electrochromic device with area of 1 m² and a 200 micrometer gap, it takes approximately 15 W of power to raise the electrolyte bulk temperature from −10° C. to 25° C.

Heating the electrochromic device 350 may increase the ionic conductivity within the electrolyte 106 and therefore decrease the switching time of the electrochromic device 350. In addition, less lithium salt and ionic liquid components may be used in the electrolyte 106 because the controller 200 regulates the heat of the electrochromic device 350. These compounds are relatively expensive, so the cost of manufacturing the electrochromic device 350 may be reduced by utilizing the controller 200 to control the temperature of the electrochromic device 350.

When the temperature of the electrochromic device 350 exceeds the minimum temperature, the controller 200 may stop heating the electrochromic device (i.e., stop applying the heating currents from current sources 302a, 302b, 330). Alternatively, the controller 200 may be configured to maintain the temperature of the electrochromic device 350 above the minimum temperature (e.g., maintain a steady temperature so that the electrochromic device does not fall below the minimum temperature). For example, the controller 200 may calculate values for the heating currents that would keep the electrochromic device 350 at a constant temperature. The controller 200 may need information about the ambient temperature in order to determine the values for the heating currents for maintaining a steady temperature.

The controller 200 may also be configured measure the inter-electrode voltages $V_1$ and $V_2$, and to set a value of the working (i.e., drive) current from current source 304 that is applied between the working electrode 104 and the counter electrode 108. The working current may be used to control the values of the inter-electrode voltages $V_1$ and $V_2$, where the values of $V_1$, $V_2$ and $V_{drive}$ are substantially equal (i.e., exactly equal or differ by 5% or less). Application of the heating currents may cause variances in the inter-electrode voltages $V_1$ and $V_2$, so the working current may be used to counteract the effect of the heating currents to keep all three voltages substantially equal. The controller 200 may vary the working current to maintain a constant value for the inter-electrode voltages $V_1$ and $V_2$.

Figure 4:
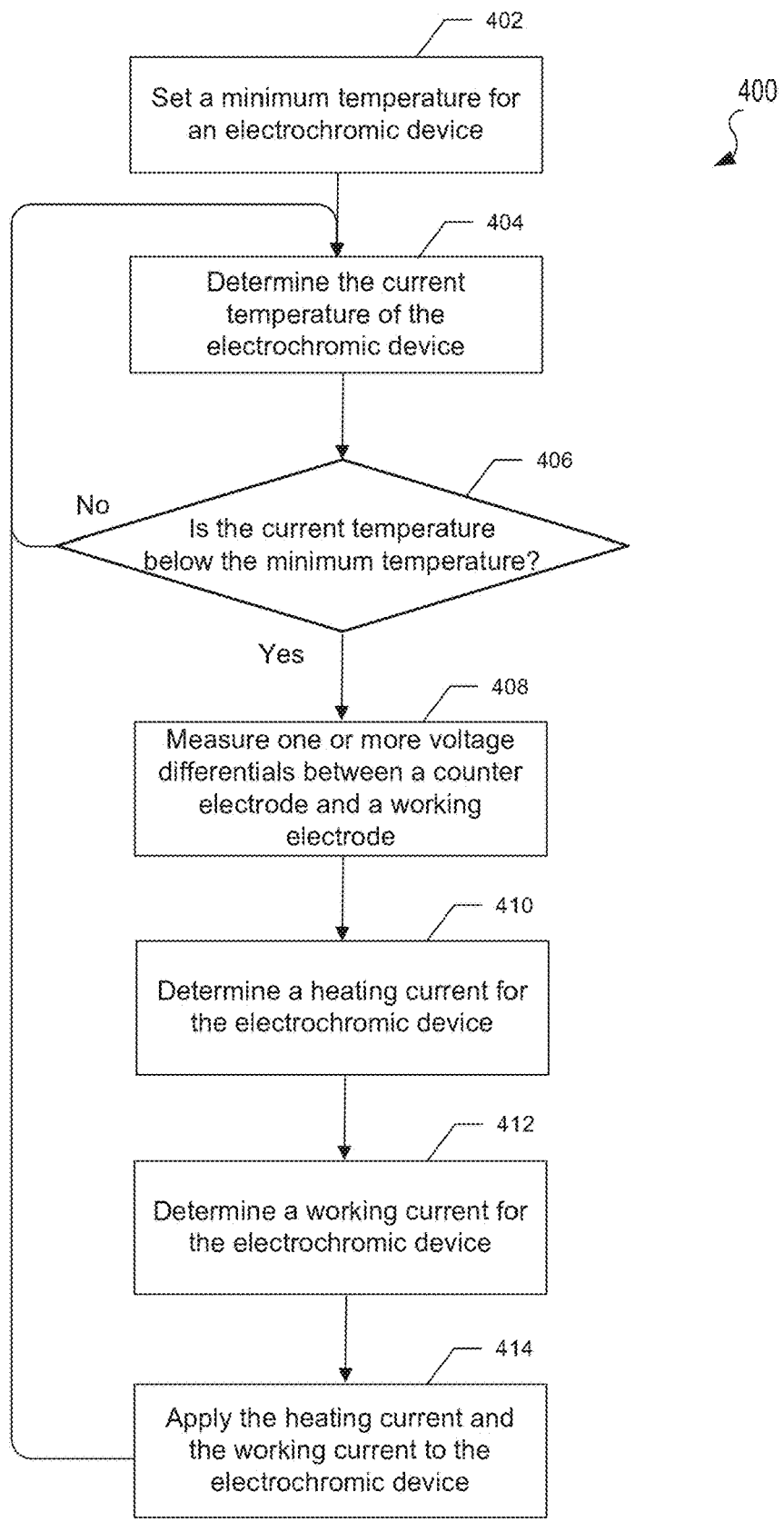
FIG. 4 is a process flow diagram of a method for controlling the temperature of an electrochromic device according to various embodiments.

FIG. 4 illustrates a method 400 for controlling the temperature of an electrochromic device according to various embodiments. The method 400 may be performed by a controller (e.g., a microprocessor or microcontroller) that is configured to control the operation of the electrochromic device. The electrochromic device may be similar to the electrochromic devices 100, 150, and 170 illustrated in FIGS. 1A-1C. For example, the electrochromic device may include two glass cover layers, two transparent conductors, a working electrode, a counter electrode, and an electrolyte between the electrodes.

In block 402, the controller may set a minimum temperature for the electrochromic device. The minimum temperature may be set as a temperature under which the performance of the electrochromic device falls below one or more performance thresholds. For example, the minimum temperature may be set as the temperature at which the switching time of the electrochromic device exceeds a threshold time. In some embodiments, the minimum temperature may be based on the normal operating temperature range of the electrochromic device. The minimum temperature may be hard-coded into the controller or may be programmable (e.g., by a device connected to the controller).

In block 404, the controller may determine (e.g., measure and/or receive from a remote source) the current temperature of the electrochromic device. The controller may be connected to a temperature sensor that measures the temperature of the electrochromic device.

In determination block 406, the controller may determine whether the current temperature of the electrochromic device is below the minimum temperature. In response to determining that the current temperature is not below the minimum temperature (i.e., determination block 406="No"), the controller may continue to monitor and determine the current temperature of the electrochromic device in blocks 404 and 406.

In response to determining that the current temperature is below the minimum temperature (i.e., determination block 406="Yes"), the controller may measure one or more voltage differentials (e.g., $V_1$ and $V_2$) between a counter electrode and a working electrode of the electrochromic device in block 408. For example, the controller may measure the inter-electrode voltage on both sides of the electrochromic device.

In block 410, the controller may determine a heating current for the electrochromic device based on the current temperature of the electrochromic device. The heating current is used to heat the electrochromic device when applied to both the transparent conductors contacting the respective working and counter electrodes of the electrochromic device. The controller may include a feedback control mechanism (e.g., PID) that may be used to determine the value of the heating current with respect to the current temperature. In block 412, the controller may determine a working current for the electrochromic device based on the measured inter-electrode voltages. Application of the heating current may affect the inter-electrode voltages, so the working (i.e., drive) current is used to counteract this effect, such that the drive voltage is substantially equal to $V_1$ and to $V_2$.

In block 414, the controller may apply the heating current and the working current to the electrochromic device. For example, the controller may apply the heating current to each of the transparent conductors of the electrochromic device. When the heating current is applied, each transparent conductor may generate heat at a rate of $I^2R$ Watts, where I is the heating current and R is the resistance of the transparent conductor. Heating the transparent conductors heats the electrolyte in the electrochromic device, which may increase ionic conductivity and thereby decreases switching time. The controller may apply the working current between the working electrode and the counter electrode of the electrochromic device to control the inter-electrode voltage. The controller may then measure the current temperature of the electrochromic device in block 404 and continue heating the electrochromic device until the temperature exceeds the minimum temperature. Once the minimum temperature is exceeded, the controller may either cease heating the electrochromic device or maintain the electrochromic device at a constant temperature. In this manner, the method 400 provides a way to improve the performance of an electrochromic device in cold temperature conditions.

Figure 5:
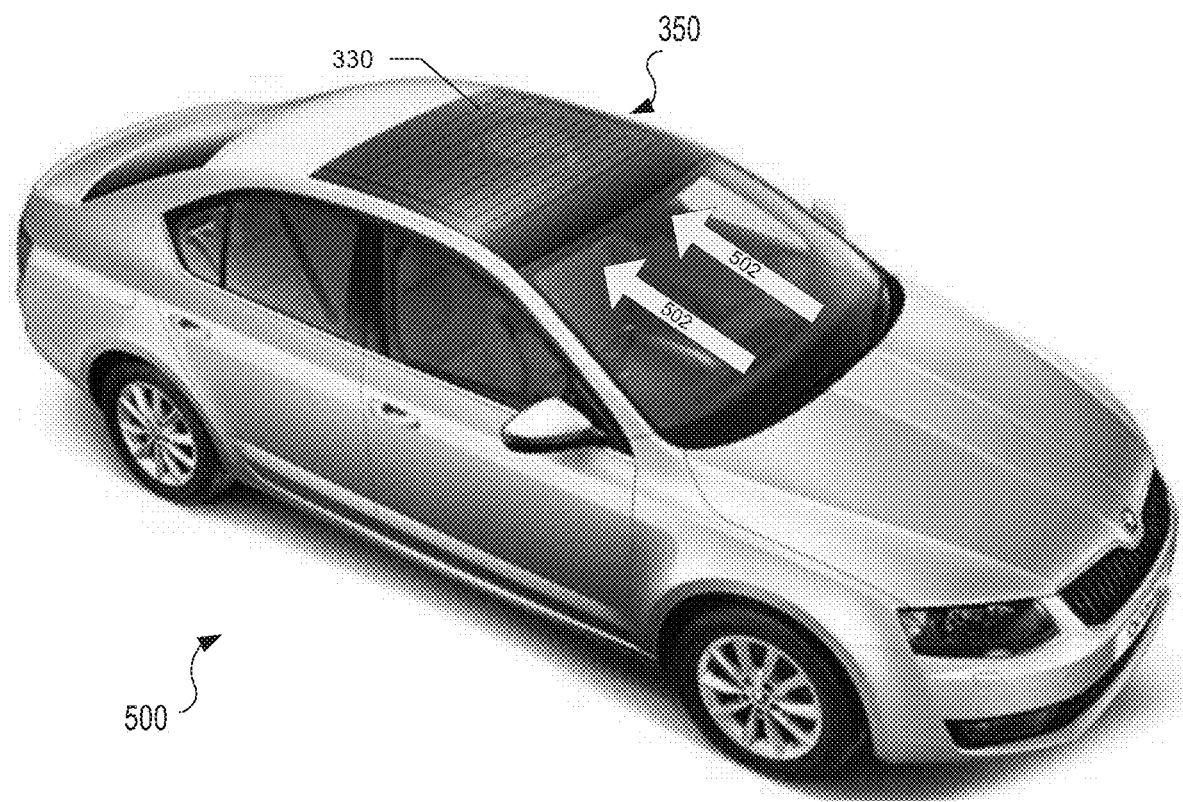
FIG. 5 is a perspective view of an automobile including the system of FIG. 3.

FIG. 5 is a perspective view of an automobile 500 including the system 300 of FIG. 3, according to various embodiments of the present disclosure. As used herein, "automobile" includes a passenger car, a sport utility vehicle, a pickup truck, a truck, and other land vehicles.

Referring to FIGS. 3 and 5, the electrochromic device 350 may be disposed on or in any of the windows of the automobile 500, such as the sunroof of the automobile 500 as shown in FIG. 5. For example, one of the transparent layers 110a, 110b may be a glass panel of the sunroof and the other of the transparent layers 110a, 110b may be support layer, or both of the transparent layers 110a, 110b may be included as sublayers of a glass panel of the sunroof.

When the automobile 500 is exposed to cold temperatures, such as temperatures of about 0° C. or less, the controller 200 may be configured to heat the electrochromic device 350 to an operating temperature of above 0° C. and/or to maintain the electrochromic device 350 at such an operating temperature. Accordingly, the system 300 may be configured to allow operation of the electrochromic device 350 in sub-freezing environments.

For example, the controller 200 may heat the electrochromic device 350 by applying current to the transparent conductors 102a, 102b, and/or the heating element 330, if the electrochromic device 350 is determined to have a temperature of less than about 0° C.

In some embodiments, the controller 200 may be configured to control the climate control system of the automobile 500 to heat the electrochromic device 350 to an operating temperature of above 0° C. For example, the controller 200 may be configured to direct heated air 502 towards the electrochromic device 350, if the temperature of the electrochromic device 350 is determined to be below about 0° C. The heated air 502 may be provided from one or more special purpose vents pointed at the electrochromic device 350 in the roof of the automobile 500. The special purpose vents may be located in the dashboard, in one or more doors, in one or more roof support columns and/or in the roof of the automobile 500.

In another embodiment, the controller 200 may be configured to increase the cabin temperature of the automobile 500, if the temperature of the electrochromic device 350 is determined to be below about 0° C. In this embodiment, the heated air 502 may be provided from the general purpose heating and air conditioning vents located in the dashboard of the automobile 500.

The controller 200 may control the temperature based on a temperature reading provided from a special purpose or general purpose temperature sensor. In one embodiment, the special purpose temperature sensor 306 shown in FIG. 3 may be located in the sunroof of the automobile 500. The special purpose temperature sensor 306 may directly measure the temperature of the electrochromic device 350 and provide the temperature reading to the controller 200. In another embodiment, the general purpose temperature sensor of the automobile 500 may be used to determine the interior and/or exterior temperature of the automobile 500 and provide the temperature reading(s) to the controller 200. The controller 200 can then calculate the temperature of the electrochromic device 350 from these temperature reading(s).

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A method of controlling a temperature of an electrochromic device, comprising:
   determining a current temperature of the electrochromic device, wherein the electrochromic device comprises a first transparent conductor electrically connected to a working electrode, and a second transparent conductor electrically connected to a counter electrode;

applying the heating current to the first transparent conductor and the second transparent conductor, when the current temperature is determined to be below a minimum temperature, wherein the heating current heats the electrochromic device via the first transparent conductor and the second transparent conductor; and applying a working current between the working electrode and the counter electrode to change a transmission state of the working electrode.

2. The method of claim 1, further comprising:

measuring at least one voltage differential between a working electrode and a counter electrode of the electrochromic device while applying the heating current;

determining a working current voltage based on the at least one voltage differential; and applying the working current at the determined working current voltage.

3. The method of claim 2, wherein the working current counteracts the effect of the heating current on the at least one voltage differential.

4. The method of claim 2, wherein the at least one voltage differential comprises a first voltage differential between the working electrode and the counter electrode on a first end of the electrochromic device, and a second voltage differential between the working electrode and the counter electrode on a second end of the electrochromic device.

5. The method of claim 1, further comprising:

setting the minimum temperature for the electrochromic device;

determining whether the current temperature is below the minimum temperature, wherein applying the heating current to the first transparent conductor and the second transparent conductor is performed in response to determining that the current temperature is below the minimum temperature.

6. The method of claim 1, wherein the heating current increases an ionic conductivity of an electrolyte in the electrochromic device.

7. The method of claim 1, wherein applying the heating current to the first transparent conductor and the second transparent conductor comprises applying a direct current from at least one direct current source.

8. The method of claim 1, wherein applying the heating current to the first transparent conductor and the second transparent conductor comprises applying a first constant current from a first constant current source to the first transparent conductor, and applying a second constant current from a second constant current source to the second transparent conductor.

9. An automobile comprising:

a window; and an electrochromic system comprising:

an electrochromic device disposed on the window, the electrochromic device comprising:

a working electrode;

a counter electrode;

an electrolyte between the working electrode and the counter electrode;

a first transparent conductor contacting with the working electrode; and a second transparent conductor contacting the counter electrode; and a controller configured to control heating of the electrochromic device, such that the electrochromic device is heated to a temperature of greater than 0° C., when the controller determines that the electrochromic device has a temperature of less than 0° C., during operation of the automobile.

10. The automobile of claim 9, further comprising a climate control system configured to heat the interior of the automobile, wherein the controller is configured to control the climate control system, such that the climate control system heats the electrochromic device to the temperature of greater than 0° C. during operation of the automobile.

11. The automobile of claim 9, further comprising a resistive heater comprising a heating element disposed on the window, wherein the controller is configured to control the application of a voltage to the heating element, such that the heating element heats the electrochromic device to the temperature of greater than 0° C. during operation of the automobile.

12. The automobile of claim 9, wherein the window is a sunroof of the automobile.

13. The automobile of claim 9, further comprising:

a first constant current source electrically connected to and configured to apply the heating current to the first transparent conductor; and a second constant current source electrically connected to and configured to apply the heating current to the second transparent conductor, wherein the controller is configured to control the application of the heating current to the first and second transparent conductors, such that the first and second transparent conductors heat the electrochromic device to the temperature of greater than 0° C. during operation of the automobile.

* * * * *